United States Patent
Gambhire

(10) Patent No.: US 7,574,060 B2
(45) Date of Patent: Aug. 11, 2009

(54) DEBLOCKER FOR POSTPROCESS DEBLOCKING

(75) Inventor: Pranav Gambhire, Andover, MA (US)

(73) Assignee: Broadcom Corporation, Irvine, CA (US)

( * ) Notice: Subject to any disclaimer, the term of this patent is extended or adjusted under 35 U.S.C. 154(b) by 796 days.

(21) Appl. No.: 10/995,588

(22) Filed: Nov. 22, 2004

(65) Prior Publication Data

US 2006/0110056 A1    May 25, 2006

(51) Int. Cl.
*G06K 9/46* (2006.01)
(52) U.S. Cl. .............. 382/233; 382/232; 382/236; 382/250; 382/251; 382/268
(58) Field of Classification Search ........... 382/232, 382/233, 236, 248, 250, 251, 260, 268; 375/240.03, 375/240.16, 240.24, 240.29; 345/462
See application file for complete search history.

(56) References Cited

U.S. PATENT DOCUMENTS 7,099,515 B2 *   8/2006   Lin et al. ............... 382/240
2005/0036697 A1 *   2/2005   Shim et al. ............ 382/233
2005/0053296 A1 *   3/2005   Srinivasan et al. ..... 382/236
2005/0259688 A1 * 11/2005   Gordon ................ 370/477
2006/0078052 A1 *   4/2006   Dang ................. 375/240.24
2006/0133689 A1 *   6/2006   Andersson et al. ...... 382/261

* cited by examiner

*Primary Examiner*—Matthew C Bella
*Assistant Examiner*—Ali Bayat
(74) *Attorney, Agent, or Firm*—McAndrews Held & Malloy, Ltd.

(57) ABSTRACT

Presented herein are system(s), method(s), and apparatus for a deblocker for postprocess deblocking. In one embodiment, there is presented a decoder system for deblocking video data. The decoder system comprises a video decoder for decoding video data comprising portions that are predicted from deblocked pictures. The decoder system further comprises a video decoder for decoding video data comprising portions that are predicted from undeblocked pictures. In addition, the decoder, system comprises a deblocker for deblocking the video data comprising portions that are predicted from deblocked pictures and for deblocking the video data comprising portions that are predicted from undeblocked pictures.

13 Claims, 9 Drawing Sheets

DEBLOCKER FOR POSTPROCESS DEBLOCKING

PRIORITY CLAIM

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Low bit rate video encoding suppresses high frequency components and minimizes motion compensation residuals. This results in a grid like blocky appearance of the decoded image. Sharp transitions in encoding parameters at block boundaries are responsible for these blocky artifacts. Additionally at medium bitrates, a loss of high frequency components produces a shimmering effect (called ringing) at high contrast edges. Low pass filtering can rectify these artifacts.

De-blocking filters eliminate or minimize the blockiness by blurring the block boundaries. A low pass filter blur can merge the block boundaries into their surrounding blocks making the transition smoother and eliminating the blocky look. However indiscriminate low pass edge filtering can cause a loss of contrast especially when high frequency image objects are located at or close to block boundaries.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Presented herein are system(s), method(s), and apparatus for a deblocker for postprocess deblocking.

In one embodiment, there is presented a decoder system for deblocking video data. The decoder system comprises a video decoder for decoding video data comprising portions that are predicted from deblocked pictures. The decoder system further comprises a video decoder for decoding video data comprising portions that are predicted from undeblocked pictures. In addition, the decoder system comprises a deblocker for deblocking the video data comprising portions that are predicted from deblocked pictures and for deblocking the video data comprising portions that are predicted from undeblocked pictures.

In another embodiment, there is presented a method for deblocking. The method comprises converting quantization parameters for video data comprising portions that are predicted from undeblocked pictures to quantization parameters for video data comprising portions that are predicted from deblocked pictures.

In another embodiment, there is presented a decoder system for deblocking video data. The decoder system comprises a video decoder operable to decode video data comprising portions that are predicted from deblocked pictures. The decoder system further comprises a video decoder operable to decode video data comprising portions that are predicted from undeblocked pictures. Additionally, the decoder system comprises a deblocker. The deblocker is operably connected to the video decoder operable to decode video data comprising portions that are predicted from deblocked pictures, and the video decoder operable to decode video data comprising portions that are predicted from undeblocked pictures. The deblocker is operable to deblock the video data comprising portions that are predicted from deblocked pictures and deblock the video data comprising portions that are predicted from undeblocked pictures.

These and other advantages and novel features of the present invention, as well as details of an illustrated embodiment thereof, will be more fully understood from the following description and drawings.

DETAILED DESCRIPTION OF THE INVENTION

According to certain aspects, of the present invention, a deblocker deblocks video data for both MPEG-2 and H.264 video data.

The video encoding standards, MPEG-2 and the ITU-H.264 Standard (H.264) (also known as MPEG-4, Part 10, and Advanced Video Coding), will now be described.

MPEG-2 and H.264 Standards

Figure 1:
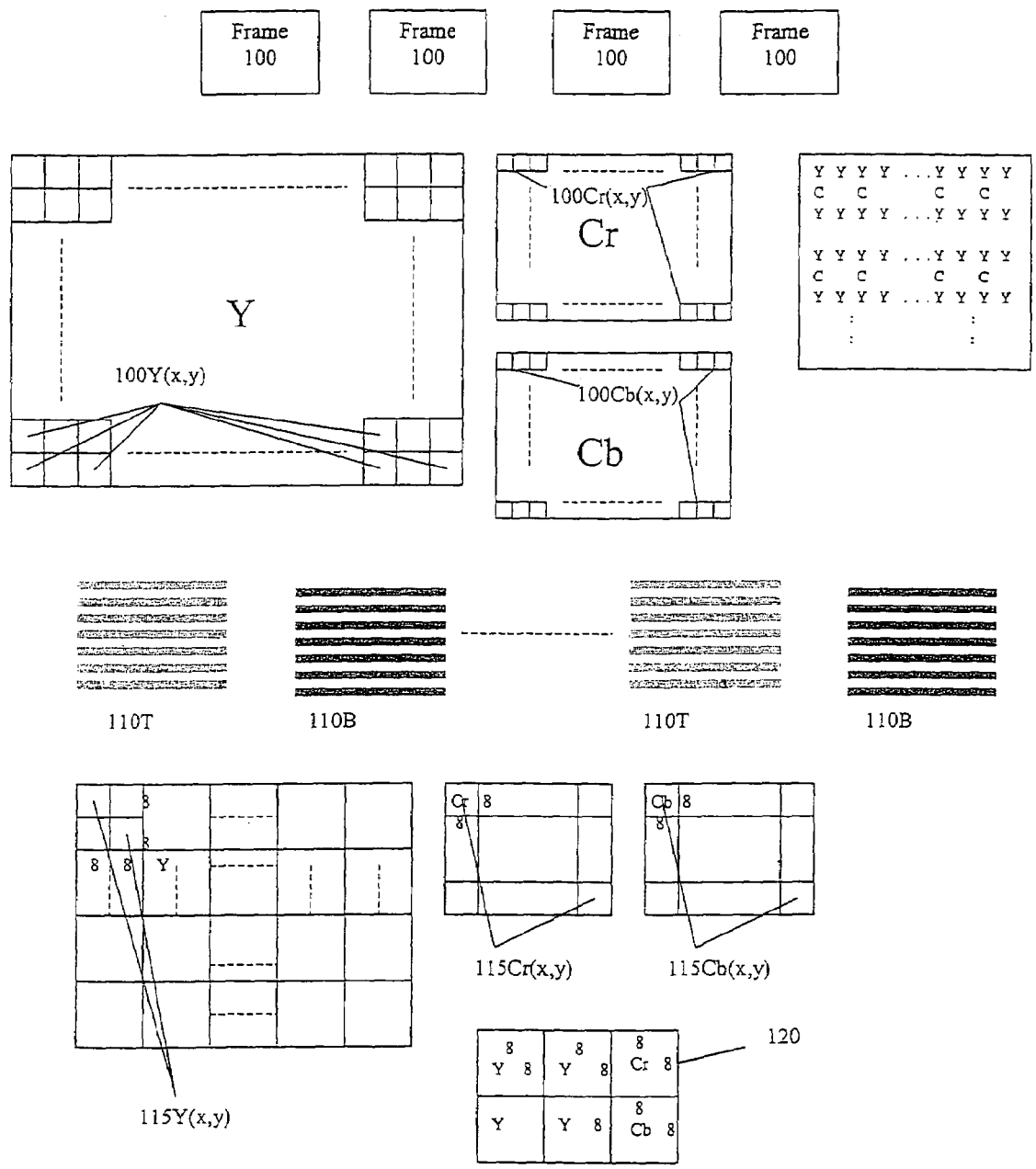
FIG. 1 is a block diagram of a frame.

Referring now to FIG. 1, there is illustrated a block diagram of a frame 100. A video camera captures frames 100 from a field of view during time periods known as frame durations. The successive frames 100 form a video sequence. A frame 100 comprises two-dimensional grid(s) of pixels 100(x,y).

For color video, each color component is associated with a two-dimensional grid of pixels. For example, a video can include luma, chroma red, and chroma blue components.

Accordingly, the luma, chroma red, and chroma blue components are associated with a two-dimensional grid of pixels 100Y(x,y), 100Cr(x,y), and 100Cb(x,y), respectively. When the grids of two dimensional pixels 100Y(x,y), 100Cr(x,y), and 100Cb(x,y) from the frame are overlayed on a display device 110, the result is a picture of the field of view at the frame duration that the frame was captured.

Generally, the human eye is more perceptive to the luma characteristics of video, compared to the chroma red and chroma blue characteristics. Accordingly, there are more pixels in the grid of luma pixels 100Y(x,y) compared to the grids of chroma red 100Cr(x,y) and chroma blue 100Cb(x,y). In the MPEG 4:2:0 standard, the grids of chroma red 100Cr(x,y) and chroma blue pixels 100Cb(x,y) have half as many pixels as the grid of luma pixels 100Y(x,y) in each direction.

The chroma red 100Cr(x,y) and chroma blue 100Cb(x,y) pixels are overlayed the luma pixels in each even-numbered column 100Y(x, 2y) between each even, one-half a pixel below each even-numbered line 100Y(2x, y). In other words, the chroma red and chroma blue pixels 100Cr(x,y) and 100Cb (x,y) are overlayed pixels 100Y(2x+½, 2y).

If the video camera is interlaced, the video camera captures the even-numbered lines 100Y(2x,y), 100Cr(2x,y), and 100Cb(2x,y) during half of the frame duration (a field duration), and the odd-numbered lines 100Y(2x+1,y), 100Cr(2x+1,y), and 100Cb(2x+1,y) during the other half of the frame duration. The even numbered lines 100Y(2x,y), 100Cr(2x,y), and 100Cb(2x,y) what is known as a top field 110T, while odd-numbered lines 100Y(2x+1,y), 100Cr(2x+1,y), and 100Cb(2x+1,y) form what is known as the bottom field 110B. The top field 110T and bottom field 110T are also two dimensional grid(s) of luma 110YT(x,y), chroma red 110CrT(x,y), and chroma blue 110CbT(x,y) pixels.

The frame 100Y(x,y), or top/bottom fields 110YT/B(x,y) can be divided into 8×8 pixel 100Y(8x->8x+7, 8y->8y+7) blocks 115Y(x,y). For every four blocks of luma pixels 115Y (x,y), there is a corresponding 8×8 block of chroma red pixels 115Cr(x,y) and chroma blue pixels 115Cb(x,y) comprising the chroma red and chroma blue pixels that are to be overlayed the block of luma pixels 115Y(x,y). The blocks of luma pixels 115Y(x,y), and the corresponding blocks of chroma red pixels 115Cr(x,y) and chroma blue pixels 115Cb(x,y) are collectively known as a macroblock 120.

The MPEG-2 and H.264 standards encode video on a frame by frame basis, and encode frames on a macroblock by macroblock basis. MPEG-2 specifies the use of temporal prediction, transformation, H.264 specifies the use of spatial prediction, temporal prediction, transformation, interlaced coding, and lossless entropy coding to compress the macroblocks 120.

Unless otherwise specified, it is assumed the pixel dimensions for a unit, such as a macroblock or block, shall generally refer to the dimensions of the luma pixels of the unit. Also, and unless otherwise specified, it is assumed that a unit with a given pixel dimension shall also generally include the corresponding chroma red and chroma blue pixels that overlay the luma pixels. However, these assumptions shall not operate to limit the scope of the present invention. The dimensions of the chroma red and chroma blue pixels for the unit depend on whether MPEG 4:2:0, MPEG 4:2:2 or other format is used, and may differ from the dimensions of the luma pixels.

Intra-Prediction

Figure 2A:
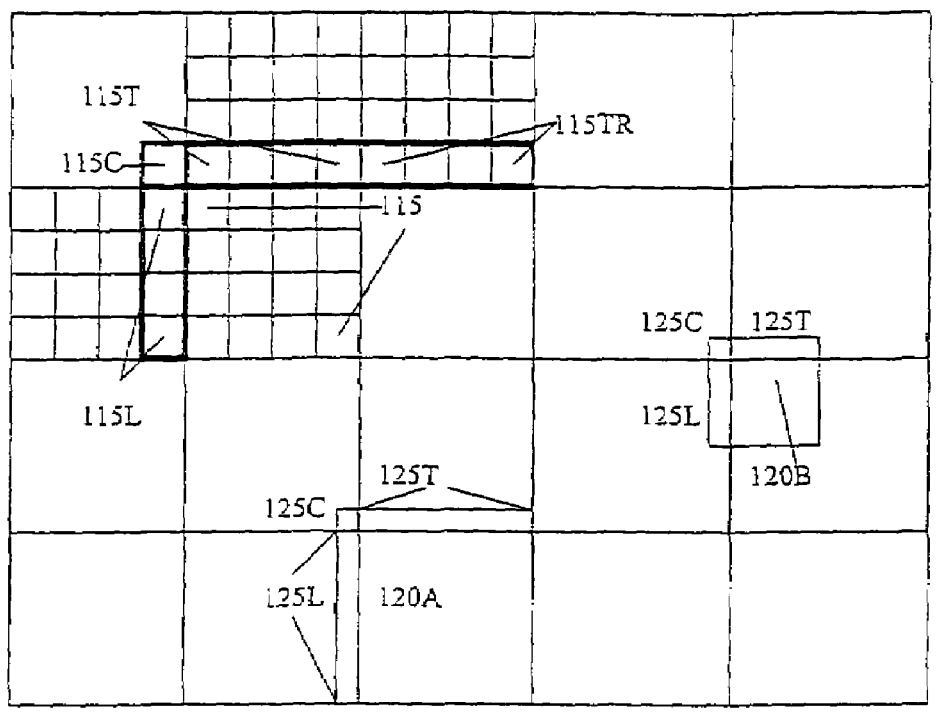
FIG. 2A is a block diagram of spatially encoded macroblocks.
Figure 2A:
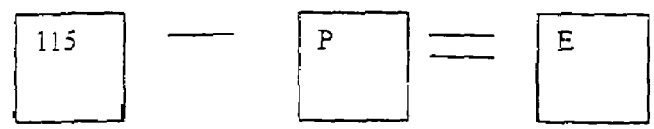

Referring now to FIG. 2A, there is illustrated a block diagram describing spatially encoded macroblocks 120. Spatial prediction, also referred to as intraprediction, is used in H.264 and involves prediction of frame pixels from neighboring pixels. The pixels of a macroblock 120 can be predicted, either in a 16×16 mode, an 8×8 mode, or a 4×4 mode.

In the 16×16 and 8×8 modes, e.g. macroblock 120a, and 120b, respectively, the pixels of the macroblock are predicted from a combination of left edge pixels 125L, a corner pixel 125C, and top edge pixels 125T. The difference between the macroblock 120a and prediction pixels P is known as the prediction error E. The prediction error E is calculated and encoded along with an identification of the prediction pixels P and prediction mode, as will be described.

In the 4×4 mode, the macroblock 120c is divided into 4×4 blocks 115. The 4×4 blocks 115 of the macroblock 120a are predicted from a combination of left edge blocks 115L, a corner block 115C, right edge blocks 115R, and top right blocks 115TR. The difference between the macroblock 120a and prediction pixels P is known as the prediction error E. The prediction error E is calculated and encoded along with an identification of the prediction pixels and prediction mode, as will be described. A macroblock 120 is encoded as the combination of the prediction errors E representing its blocks 115.

Temporal Prediction

Figure 2B:
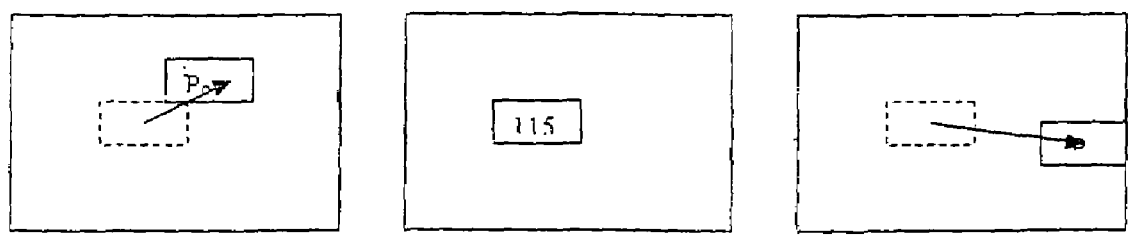
FIG. 2B is a block diagram describing temporally encoded macroblocks.
Figure 2B:
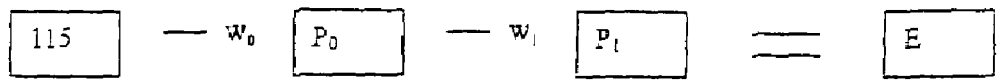
Figure 2B:
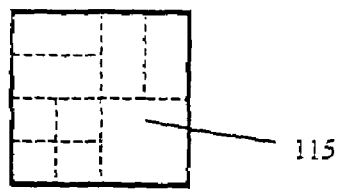

Referring now to FIG. 2B, there is illustrated a block diagram describing temporally encoded macroblocks 120. Both MPEG-2 and H.264 use temporal prediction. In H.264, the macroblocks 120 can be divided into 16×8, 8×16, 8×8, 4×8, 8×4, and 4×4 blocks 115. In MPEG-2, the macroblock 120 is divided into 8×8 blocks 115. Each block 115 is compared to the pixels of other frames or fields for a similar block of pixels P. A macroblock 120 is encoded as the combination of the prediction errors E representing its blocks 115.

The similar block of pixels is known as the prediction pixels P. The difference between the block 115/macroblock 120 and the prediction pixels P is known as the prediction error E. The prediction error E is calculated and encoded, along with an identification of the prediction pixels P. The prediction pixels P are identified by motion vectors MV. Motion vectors MV describe the spatial displacement between the block 115/macroblock 120 and the prediction pixels P. In H.264, the motion vectors MV can, themselves, be predicted from neighboring blocks.

In H.264, the block can also be predicted from blocks of pixels P in more than one field/frame. In bi-directional coding, the block 115 can be predicted from two weighted blocks of pixels, P0 and P1. Accordingly a prediction error E is calculated as the difference between the weighted average of the prediction blocks w0P0+w1P1 and the block 115. The prediction error E, an identification of the prediction blocks P0, P1 are encoded. The prediction blocks P0 and P1 are identified by motion vectors MV.

The weights w0, w1 can also be encoded explicitly, or implied from an identification of the field/frame containing the prediction blocks P0 and P1. The weights w0, w1 can be implied from the distance between the frames/fields containing the prediction blocks P0 and P1 and the frame/field containing the block 115. Where T0 is the number of frame/field durations between the frame/field containing P0 and, the frame/field containing the block, and T1 is the number of frame/field durations for P1, $$w0=1-T0/(T0+T1)$$

$$w1=1-T1/(T0+T1)$$

For a high definition television picture, there are thousands of macroblocks 120 per frame 100. The macroblocks 120, themselves can be partitioned into potentially 16 4×4 blocks 115, each associated with potentially different motion vector sets. Thus, coding each of the motion vectors without data compression can require a large amount of data and bandwidth.

Transformation, Quantization, and Scanning

Figure 2C:
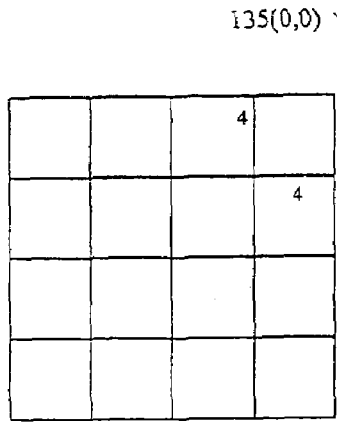
FIG. 2C is a block diagram describing the encoding of the prediction error.
Figure 2C:
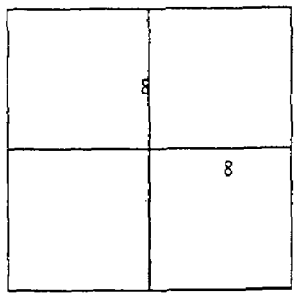
Figure 2C:

Referring now to FIG. 2C, there is illustrated a block diagram describing the encoding of the prediction error E. With both spatial prediction and temporal prediction, the macroblock 120 is represented by a prediction error E. The prediction error E is also two-dimensional grid of pixel values for the luma Y, chroma red Cr, and chroma blue Cb components with the same dimensions as the macroblock 120.

In H.264, a transformation transforms 4×4 blocks 115(0,0) ... 130(3,3) of the prediction error E to the frequency domain, thereby resulting in corresponding sets 135(0,0) ... 135(3,3) of frequency coefficients $f_{00} \ldots f_{33}$. In MPEG-2, a discrete cosine transformation transforms 8×8 macroblocks 120 into corresponding blocks of frequency coefficients $f_{00} \ldots f_{77}$. The sets of frequency coefficients are then quantized and scanned, resulting in sets 140 of quantized frequency coefficients, $F_0 \ldots F_n$. A macroblock 120 is encoded as the combination of its blocks 115.

Macroblock Adaptive Frame/Field (MBAFF) Coding

Figure 3:
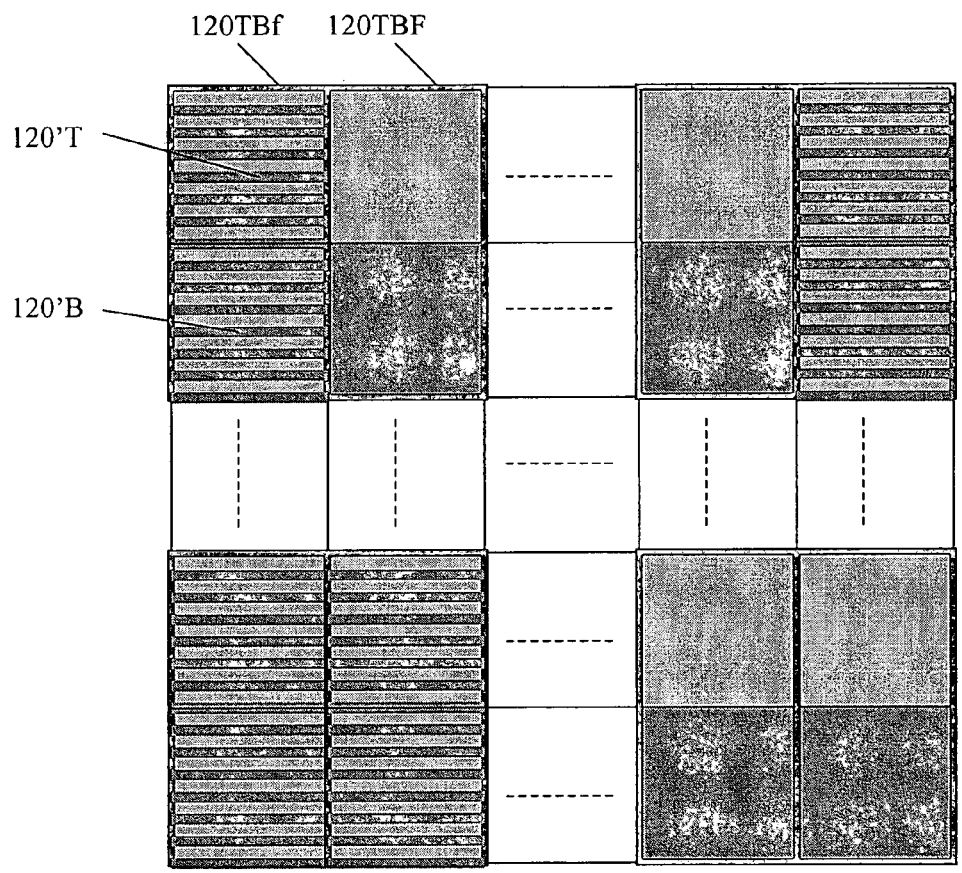
FIG. 3 is a block diagram describing macroblock adaptive field/frame (MBAFF) encoding.

Referring now to FIG. 3, there is illustrated a block diagram describing the encoding of macroblocks 120 for interlaced fields. As noted above, interlaced fields, top field 110T(x,y) and bottom field 110B(x,y) represent either even or odd-numbered lines.

In MBAFF, each macroblock 120T in the top frame is paired with the macroblock 120B in the bottom frame, that is interlaced with it. The macroblocks 120T and 120B are then coded as a macroblock pair 120TB. The macroblock pair 120TB can either be field coded, i.e., macroblock pair 120TBF or frame coded, i.e., macroblock pair 120TBf. Where the macroblock pair 120TBF are field coded, the macroblock 120T is encoded, followed by macroblock 120B. Where the macroblock pair 120TBf are frame coded, the macroblocks 120T and 120B are deinterlaced. The foregoing results in two new macroblocks 120'T, 120'B. The macroblock 120'T is encoded, followed by macroblock 120'B.

Deblocking

As noted above, pictures 100 are encoded on a macroblock 120 by macroblock 120 basis. The foregoing has a tendency to cause visible block 115 and macroblock 120 boundaries in the picture 100. In H.264, a deblocking filter is applied during the encoding process. As noted above, blocks 115 can be predicted from the same or other pictures 100. In H.264, the blocks 115 are predicted from deblocked pictures.

In MPEG-2, the deblocking filter can be applied after the decoding process. Macroblocks 120 are predicted from pictures 120 that are not deblocked.

Decoder System

Figure 4:
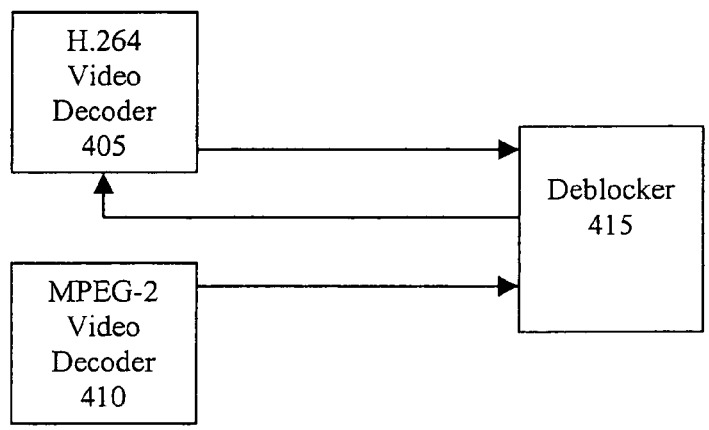
FIG. 4 is a block diagram describing an exemplary decoder system in accordance with an embodiment of the present invention.

Referring now to FIG. 4, there is illustrated a block diagram describing an exemplary decoder system 400 for decoding H.264. and MPEG-2 encoded video data in accordance with an embodiment of the present invention. The decoder system 400 comprises an H.264 video decoder 405, and MPEG-2 video decoder 410, and a deblocker 415.

The H.264 decoder 405 decodes H.264 encoded video data, while the MPEG-2 video decoder 410 decodes MPEG-2 encoded video data. The deblocker 415 deblocks pictures 100 generated by both the H.264 video decoder 405 and the MPEG-2 video decoder 410.

As noted above, blocks 115 in H.264 are predicted from deblocked pictures 100, while macroblocks 120 in MPEG-2 are predicted from undeblocked pictures 100. Accordingly, there is a feedback loop from the deblocker 415 to the H.264 video decoder 405 for providing deblocked pictures 100 as reference pictures.

Figure 5:
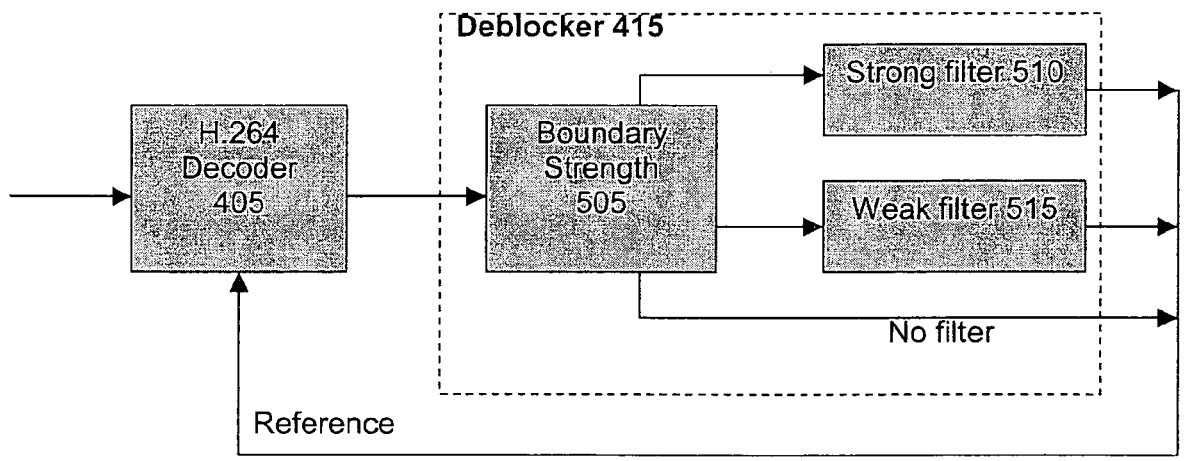
FIG. 5 is a block diagram describing the interface between an H.264 video decoder deblocker interface in accordance with an embodiment of the present invention.

Referring now to FIG. 5, there is illustrated a block diagram describing the interface between the H.264 video decoder 405 and the deblocker 415. The deblocker 415 includes a boundary strength detector 505, a strong filter 510, and a weak filter 515.

The deblocker 415 uses boundary strengths and pixel gradients and transitions to determine whether to use the strong filter 510, the weak filter 515, or no filter, as described below:

(1) Boundary strengths: The following boundary characteristics have been observed to cause perceptible blocking artifacts:

a. Either one (or both) of the blocks 120 sharing the boundary is intracoded: When this condition is true and both the blocks 120 are coded in frame mode 120TBF the boundary is assigned strength of 4. Otherwise it is assigned strength of 3.

b. Either one of the blocks 120 (or both) has non-zero transform $f_0 \ldots f_n$ coefficient levels: The boundary is assigned strength of 2.

c. One of the blocks is coded in frame mode 120TBF whereas the other is coded in field mode 120TBf: The boundary is assigned strength of 1.

d. The difference in motion vectors between the two blocks 120 is greater than 1: The boundary is assigned strength of 1.

A boundary associated with a higher strength is a candidate for a stronger filter.

2. Pixel gradients and transitions: Real edges from picture objects tend to occupy at least three pixels in cross section and are characterized by a sharp transition in pixel values. False edges arising from blocking artifacts on the other hand do not display any cross section and the pixel transition, though perceptible, is not high. The absence of a real edge is deduced using the following two functions:

a. Pixel value difference at the edge<$0.8(2^{x/6}-1)$. This function $0.8(2^{x/6}-1)$ is represented by $\alpha(x)$.

b. Pixels value difference on either sides of the edge<0.5x−7. This function is represented by $\beta(x)$, where x is the current quantization parameter. If either of the above two conditions is false, then a real edge most likely occurs at the boundary and hence no filtering operation is performed.

The strong filter 505 is applied at luma block boundaries whose strengths equal 4. A weaker filter 510 is applied at all other luma boundaries. For chroma blocks with strengths less than 4 the weak filter 510 is applied. In an exemplary case, the strong filter 505 has six taps, while the weak filter 510 has two taps.

Figure 6:
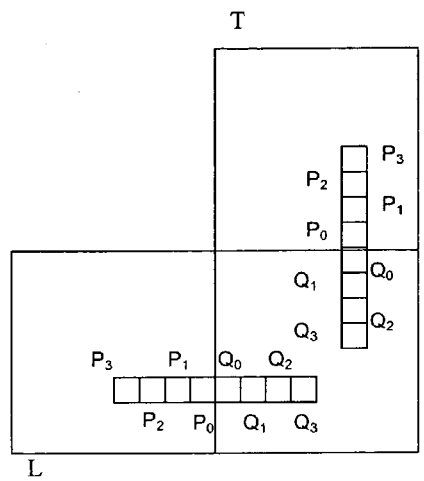
FIG. 6 is a block diagram describing neighboring pixels.

Referring now to FIG. 6, there is illustrated a block diagram describing neighboring blocks 120. The neighboring blocks include a top neighbor T, and a left neighbor L. The neighboring blocks 120 include pixels $P_0 \ldots P_3$ while the current block 120 includes pixels $Q_0 \ldots Q_3$. The subscript of the pixels indicates their distance from the border.

According to certain aspects of the present invention, the strong filter 405 is specified as follows for the luma pixels:

$$P_0=(P_2+2P_1+2P_0+2P_0+Q_1+4)/8$$

$$P_1=(P_2+P_1+P_0+Q_0+2)/4$$

$$P_2=(2P_3+3P_2+P_1+P_0+Q_0+4)/8$$

$$Q_0=(Q_2+2Q_1+2Q_0+2P_0+P_1+4)/8$$

$$Q_1=(Q_2+Q_1+Q_0+P_0+2)/4$$

$$Q_2=(2Q_3+3Q_2+Q_1+Q_0+P_0+4)/8$$

For chroma pixels, the equations for $P_1$, $P_2$, $Q_1$, $P_2$ may be omitted by the strong filter 405. According to certain aspects of the present invention, the weak filter 410 can be specified as:

$$P_0 = P_0 + (4(P_0 - Q_0) + (P_1 - Q_1) + 4)/8.$$

$$P_1 = P_1 + (P_2 + ((P_0 + Q_0 + 1)/4) - 2Q_1)/2.$$

$$Q_0 = Q_0 + (4(Q_0 - P_0) + (Q_1 - P_1) + 4)/8.$$

$$Q_1 = Q_1 + (Q_2 + ((Q_0 + P_0 + 1)/4) - 2P_1)/2.$$

Figure 7:
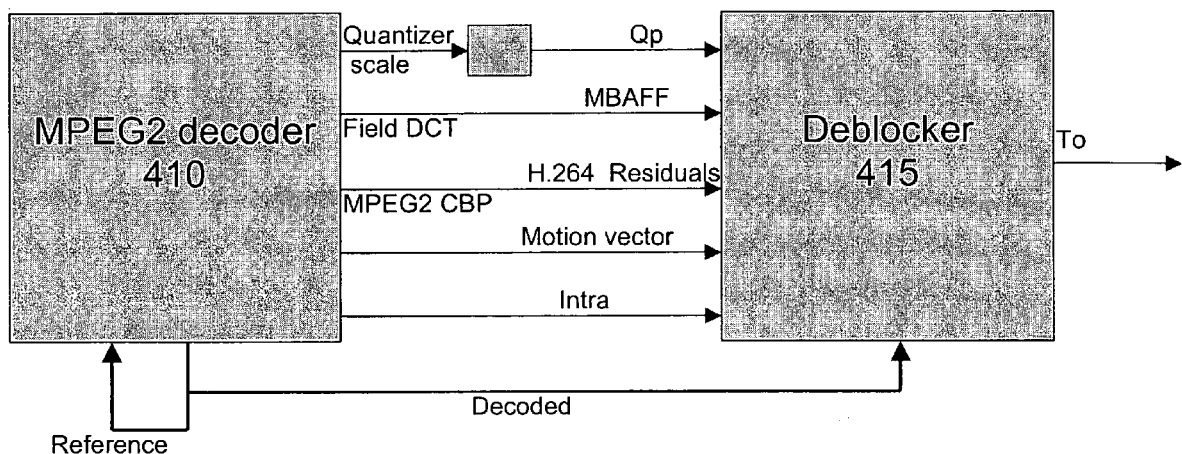
FIG. 7 is a block diagram describing an interface between the MPEG-2 video decoder and a deblocker in accordance with an embodiment of the present invention.

Referring now to FIG. 7, there is illustrated a block diagram describing the interface between the MPEG-2 decoder 410 and the deblocker 415. The MPEG-2 video decoder 410 provides the quantizer scale, field discrete cosine transformation transformation coding, the coded block pattern, motion vector differences, and an intramode indicator to the deblocker 415. The deblocker 415 deblocks MPEG-2 video data and provides the deblocked MPEG-2 video data for display.

The following considerations are resolved as will be described below:

(1) Translating the MPEG2 quantization parameter for the block to an equivalent H.264 quantization parameter.

(2) Identifying the correct neighbor, wherea block is frame coded and its neighbors are field coded or vice versa.

(3) Skipped blocks and blocks with no residuals will not have an associated quantization parameter. In H.264 coding such blocks do not need to be filtered because they have already been filtered in the reference picture. However if the filter is used outside of the loop, the reference picture has not been filtered and hence filtering has to be applied even for skipped blocks.

For chroma block boundaries the boundary strengths are determined by examining their corresponding luma block boundaries. When chroma is subsampled (in MPEG 4:2:0 and 4:2:2 modes) each chroma edge corresponds to two luma edges. Such chroma edges are partitioned at their center such that each block now corresponds to a single luma edge and boundary strengths are determined separately for each block.

Translating MPEG2 Quantization Parameters to H.264

The quantization parameter is used to determine existence of real edges at block boundaries. The $\alpha$ and $\beta$ functions are monotonically increasing and map the quantization parameter to a set of range intervals. Higher ranges indicate blocking artifacts and lower ranges indicate the existence of true edges.

The MPEG2 inverse quantization reconstruction is specified as:

$$R_{ij} = 2 * Z_{ij} * W_{ij} * Q_p / 32 \quad (1)$$

where $Z_{ij}$ is the quantized coefficient, $W_{ij}$ is a quantizer weight chosen by the encoder to potentially reduce number of bits and $Q_p$ is the quantization parameter.

The H.264 inverse quantization reconstruction is specified as:

$$R_{ij} = Z_{ij} * (PF_{ij} / mf(Q \% 6)) * 2^{(15+Q/6)} \quad (2)$$

where Q is the quantization parameter and $PF_{ij}$ is a constant that depends on the location (i, j). The m f(x) function is specified as a translation table in the H.264 specification.

MPEG2 uses two modes of quantization—a linear mode where Qp ranges from 2 to 62 in steps of 2 and a non-linear mode where Qp ranges from 2 to 112 in nonlinear increments. All the Qp values in both these modes need to be translated to a corresponding H.264 quantization parameter.

Figure 8:
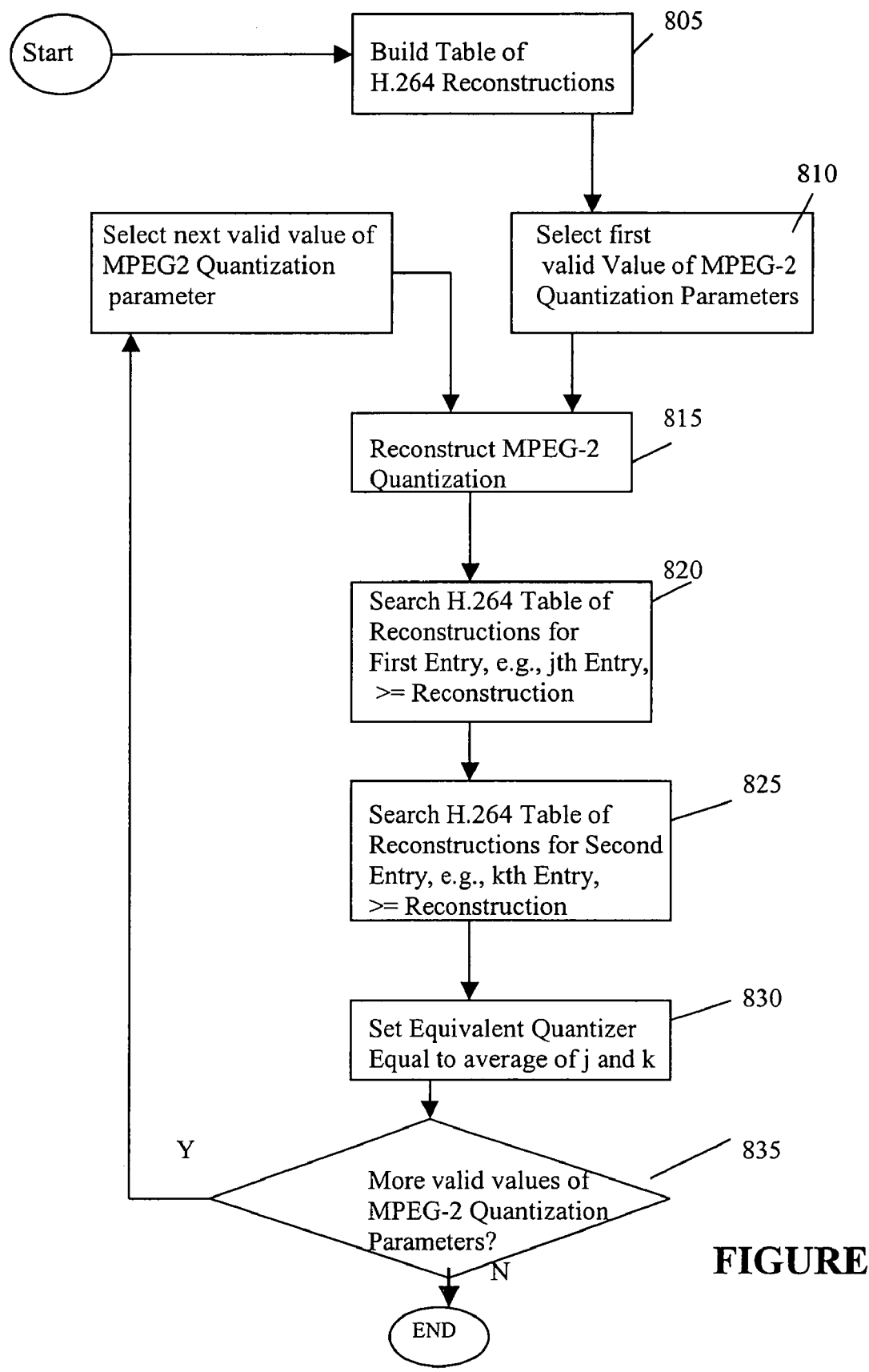
FIG. 8 is a flow diagram for translating MPEG-2 quantization parameters to H.264 parameters.

Referring now to FIG. 8, there is illustrated a flow diagram for performing the translation. At 805, a table is built of H.264 reconstructions, H264_MPEG2[Q], for $Z_{ij}=1$ for each value of Q in the range $1 \leq Q \leq 51$. Where the coefficient is located at (0, 0), $PF_{00}$ is used in the equation. This corresponds to the DC component that typically has the largest value in the block.

At 810 a first or next valid value of MPEG2 $Q_p$ is selected. At 815, R is reconstructed using equation (1) for $Q_p$ where $W_{ij}$ is 1. At 820, the table H264_MPEG2 is searched for the first entry, e.g., the $j^{th}$ entry, greater than or equal to R. At 825, the next entry is greater than R, e.g., the $k^{th}$ entry. If there is only one entry in the table equal to R then j=k. Similarly if there is no entry in the table equal to R, j=k and this entry is the first entry in the table greater than $Q_p$. At 830, the equivalent quantizer $Q_p$ is the average of j during 820 and k during 825. The foregoing, 810-830 are repeated for each valid value of MPEG2 $Q_p$.

The translation tables produced are listed below.

```
int mpeg2_linear_h264_xlate[62] = { 0, 0, 5, 5, 11,
11, 15, 15, 17, 17, 19, 19, 21, 21, 22, 22, 23, 23,
25, 25, 25, 25, 27, 27, 27, 27, 27, 27, 28, 28, 29,
29, 29, 29, 30, 30, 31, 31, 31, 31, 31, 32, 32,
33, 33, 33, 33, 33, 33, 33, 33, 33, 33, 34, 34, 34,
34, 35, 35, 35, 35, 35, 35};
```

```
int mpeg2_non_linear_h264_xlate[112] = {0, 5, 11, 15,
17, 19, 21, 22, 23, 23, 25, 25, 27, 27, 28, 28, 29,
29, 31, 31, 31, 31, 33, 33, 33, 33, 33, 33, 34, 34,
34, 34, 35, 35, 35, 35, 37, 37, 37, 37, 37, 37, 37,
37, 39, 39, 39, 39, 39, 39, 39, 39, 39, 39, 39, 39,
40, 40, 40, 40, 40, 40, 40, 41, 41, 41, 41, 41,
41, 41, 41, 43, 43, 43, 43, 43, 43, 43, 43, 43, 43,
43, 43, 43, 43, 43, 43, 45, 45, 45, 45, 45, 45,
45, 45, 45, 45, 45, 45, 45, 45, 45, 45, 45,
45, 45, 45, 45, 46};
```

Determining the Neighbor Pixels

If both the blocks adjoining a block boundary are coded in the same mode there is no confusion about the location of neighboring pixels across the edge (for low pass filtering). But these locations are ambiguous if the coding modes are different.

Figure 9A:
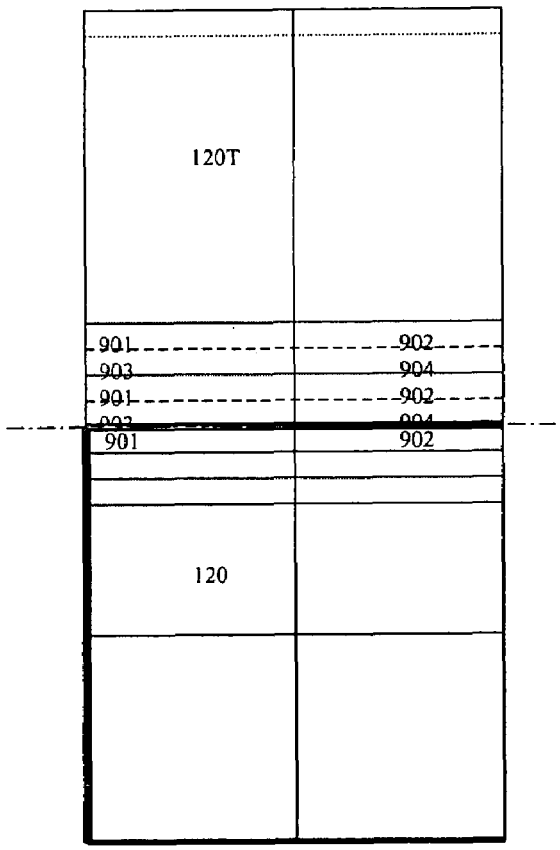
FIG. 9A is a block diagram describing a current macroblock that is frame coded and a neighboring macroblock that is field coded.

Referring now to FIG. 9A, there is illustrated a block diagram where the current macroblock 120 is frame coded and the upper neighbor macroblock 120 is field coded.

In this case block 901 of the current macroblock is a neighbor for blocks 901 and 903 of the upper neighbor macroblock. Similarly block 902 of current macroblock is a neighbor for blocks 902 and 904 of the upper neighbor macroblock. Current blocks 901 and 902 are treated as if they were coded in field mode. Upper neighbor block 1 is filtered with current block 1's hypothetical top field. Upper neighbor block 3 is filtered with current block 1's hypothetical bottom field. Similarly upper neighbor block 2 is filtered with current block 2's hypothetical top field and upper neighbor block 3 is filtered with current block 2's hypothetical bottom field.

Figure 9B:
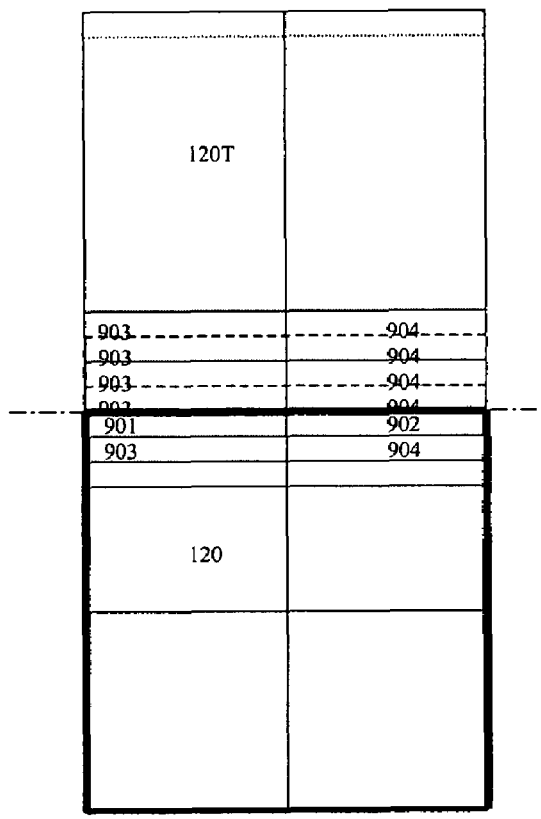
FIG. 9B is a block diagram describing a current macroblock that is field coded, and a neighboring macroblock that is frame coded.

Referring now to FIG. 9B, the current macroblock is field coded and upper neighbor macroblock is frame coded. In this case blocks 901 and 903 of the current macroblock are neighbors with block 903 of the upper neighbor macroblock. Similarly blocks 902 and 904 of the current macroblock are neighbors with block 904 of the top neighbor macroblock. The neighbor blocks 903 and 904 are treated as if they were coded in field mode. Block 901 is filtered with neighbor block 903's hypothetical top field. Block 902 is filtered with neighbor block 903's hypothetical bottom field. Similarly block 903 is filtered with neighbor block 3 hypothetical bottom field and block 904 is filtered with neighbor block 904 hypothetical bottom field.

Figure 9C:
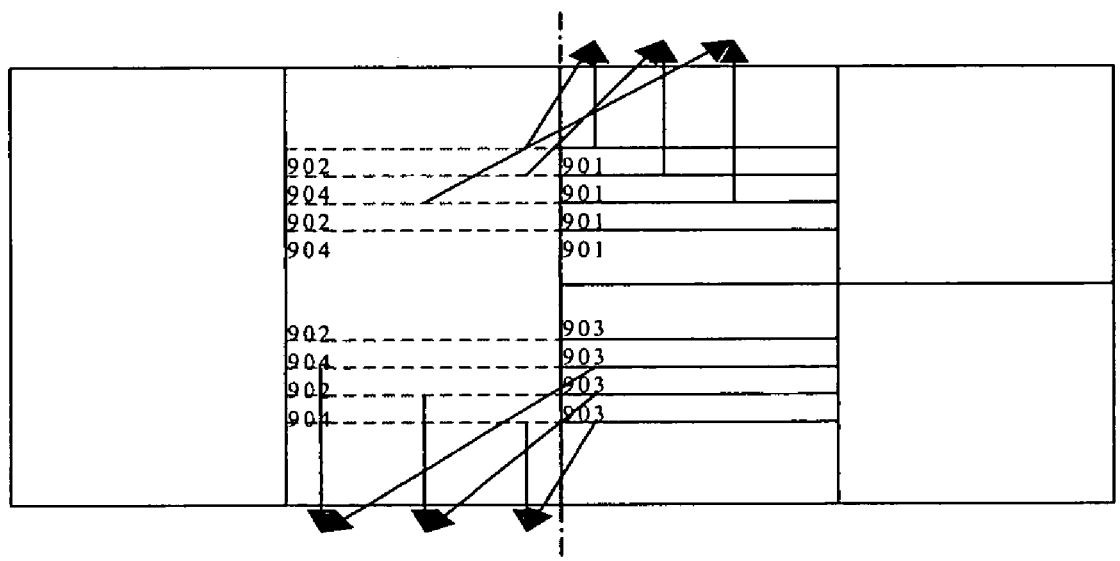
FIG. 9C is a block diagram describing a left neighboring macroblock that is encoded in a different mode than a current macroblock.

Referring now to FIG. 9C, there is illustrated a block diagram of a left neighbor that is coded in a different mode than the current bock. In this case the field coded macroblock is treated as if it were to be in frame mode. The frame blocks 901 or 903 are filtered with upper halves of neighbor blocks 902 and 904. The frame blocks 902 or 904 are filtered with lower halves of neighbor blocks 902 and 904.

Where the left neighbor is encoded in field mode, the current block in frame mode, and top neighbor in frame mode, the top block is treated as if it were field coded and scenario in FIG. 9A is applied.

Quantization Parameter for Skipped Blocks and Blocks with No Residuals

In H.264 the de-blocking filter is in the decoding loop and hence the encoder uses filtered blocks for prediction. If a block is skipped, the decoder already has its filtered version from the reference frame and no further filtering is needed. But if the de-blocking filter is used in post processing mode, the reference frame does not have the filtered block and the filter operation is needed. This block's boundaries end up getting strength of zero and hence will not be filtered.

To overcome this problem coding mode status, transform coefficient status and neighbor types are stored for each block in the picture. If a block is skipped, the parameters corresponding to it from the previous frame position are read and used to make the boundary strength and filter mode decisions. The following arrays of parameters are maintained:

int codingMode[MAX_PIC_WIDTH/9] [MAX_PIC_HEIGHT/8];
codingMode[j][k] tells whether block (j, k) from the previous picture was intra coded or inter coded.
int motionVector[MAX_PIC_WIDTH/8] [MAX_PIC_HEIGHT/8] [2] [2];
motionvector[j] [k] [0] is the top field motion vector and motionvector[j] [k] [1] is the bottom field motion vector for block (j, k) from the previous picture. If that block was a frame block the top vector contains the frame motion vector.
Int quant [MAX_PIC_WIDTH/8] [MAX_PIC_HEIGHT/8];
quant[j][k] is the quantization parameter for block (j, k) from the previous picture. Otherwise it is the quantization parameter for the block (j, k) on the current row.
bool residuals[MAX_PIC_WIDTH/8] [MAX_PIC_HEIGHT/8];
residuals[j] [k] is true if block (j, k) from previous picture was not skipped and had coded residuals.

All these arrays are updated after a non-skipped block has been processed completely by the deblocking function. For a skipped block, data from these arrays is used to make the filter decisions and the arrays are not updated after processing.

The post filtering function is performed immediately after the block has been decoded in the same pass. When a block is decoded, sufficient information exists to determine boundary strengths and to apply the filters at its left and top edges. Its right edge is filtered when the next block in raster order is decoded. The bottom edge is filtered when the block directly below it is decoded. Boundary strength determination parameters are maintained for one complete picture—the previous picture, at all times.

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain functions can be implemented in firmware. In one embodiment, a deinterlacer can be incorporated into a single integrated circuit.

Although the embodiments described herein are described with a degree of particularity, it should be noted that changes, substitutions, and modifications can be made with respected to the embodiments without departing from the spirit and scope of the present application. Accordingly, the present application is only limited by the following claims and equivalents thereof.

The invention claimed is:

1. A decoder system for deblocking video data, said decoder system comprising:
   a video decoder for decoding video data comprising portions that are predicted from deblocked pictures;
   a video decoder for decoding video data comprising portions that are predicted from undeblocked pictures; and
   a deblocker for deblocking the video data comprising portions that are predicted from deblocked pictures and for deblocking the video data comprising portions that are predicted from undeblocked pictures, wherein the deblocker further comprises:
   a first filter for filtering edges in the video data; and
   a second filter for filtering edges in the video data.

2. The decoder system of claim 1, wherein the first filter is a stronger filter than the second filter.

3. The decoder system of claim 2, wherein the deblocker selects the first filter or the second filter on the basis of pixel gradients.

4. The decoder system of claim 2, wherein the deblocker selects the first filter or the second filter on the basis of whether a current macroblock and neighboring macroblock are field or frame coded.

5. The decoder system of claim 1, wherein the deblocker converts quantization parameters for the video data comprising portions that are predicted from undeblocked pictures to quantization parameters in accordance with quantization parameters for video data that comprises portions that are predicted from deblocked pictures.

6. The decoder system of claim 1, wherein the deblocker determines neighboring pixels for a block, based on whether the block and a neighboring block are field or frame coded.

7. The decoder system of claim 1, wherein the deblocker deblocks a skipped macroblock.

8. A decoder system for deblocking video data, said decoder system comprising:
   a video decoder operable to decode video data comprising portions that are predicted from deblocked pictures;
   a video decoder operable to decode video data comprising portions that are predicted from undeblocked pictures; and
   a deblocker operably coupled to the video decoder operable to decode video data comprising portions that are predicted from deblocked pictures, and to the video decoder operable to decode video data comprising portions that are predicted from undeblocked pictures, said deblocker operable to deblock the video data comprising portions that are predicted from deblocked pictures and deblock the video data comprising portions that are predicted from undeblocked pictures, wherein the decoder further comprises:
a first filter operable to filter edges in the video data; and
a second filter operable to filter edges in the video data, wherein the first filter is a stronger filter than the second filter.

9. The decoder system of claim 8, wherein the deblocker comprises:
a boundary strength detector connected to the first filter and the second filter, the boundary strength detector operable to measure pixel gradients; and
wherein the deblocker selects the first filter or the second filter on the basis of the measured pixel gradients.

10. The decoder system of claim 9, wherein the deblocker selects the first filter or the second filter on the basis of whether a current macroblock and neighboring macroblock are field or frame coded.

11. The decoder system of claim 8, wherein the deblocker converts quantization parameters for the video data comprising portions that are predicted from undeblocked pictures to quantization parameters for the video data comprising portions that are predicted from deblocked pictures.

12. The decoder system of claim 8, wherein the deblocker determines neighboring pixels for a block, based on whether the block and a neighboring block are field or frame coded.

13. The decoder system of claim 8, wherein the deblocker deblocks a skipped macroblock.

* * * * *